United States Patent [19]
Tobiasz

[11] Patent Number: 5,947,249
[45] Date of Patent: Sep. 7, 1999

[54] DEVICE FOR FIXING AND ARTICULATING A MASTER CYLINDER ON A MOTOR VEHICLE CLUTCH PEDAL

[75] Inventor: André Tobiasz, Epinay Sur Seine, France

[73] Assignee: Valeo, Paris, France

[21] Appl. No.: 08/877,806

[22] Filed: Jun. 18, 1997

[30] Foreign Application Priority Data

Jun. 18, 1996 [FR] France ................................. 96 07661

[51] Int. Cl.$^6$ ............... F16D 25/12; F16J 1/22; F16C 11/06
[52] U.S. Cl. ............ 192/85 C; 192/99 S; 403/141; 92/129; 92/187
[58] Field of Search ................ 192/85 R, 85 C, 192/99 R, 99 S, DIG. 1; 403/122, 132, 141, 144; 60/533, 594; 92/129, 187

[56] References Cited

U.S. PATENT DOCUMENTS

| | | | |
|---|---|---|---|
| 4,650,363 | 3/1987 | Kehl et al. | 92/129 X |
| 4,831,916 | 5/1989 | Leigh-Monstevens et al. | 92/129 |
| 5,033,267 | 7/1991 | Keane | 60/594 |
| 5,290,120 | 3/1994 | Osterfield et al. | 92/187 X |

FOREIGN PATENT DOCUMENTS

| | | | |
|---|---|---|---|
| 295395 | 12/1988 | European Pat. Off. | 192/85 R |
| 3308042 | 12/1983 | Germany | 192/85 C |
| 2151297 | 7/1985 | United Kingdom | 403/141 |
| 2235961 | 3/1991 | United Kingdom | 92/187 |

*Primary Examiner*—Richard M. Lorence
*Attorney, Agent, or Firm*—Liniak, Berenato, Longacre & White

[57] ABSTRACT

A master cylinder for a motor vehicle clutch is coupled to the clutch pedal by means of a fastening and articulating device comprising a ball which is mounted pivotally in a ball housing. The ball housing is in the form of a tulip, the base of which has a thrust seating surface configured as a hollow spherical bowl; the petals of the tulip consist of fingers deformable axially to enable the ball to be introduced into the housing along the general axis of the housing, so as to be resiliently gripped within the housing by the fingers.

13 Claims, 4 Drawing Sheets

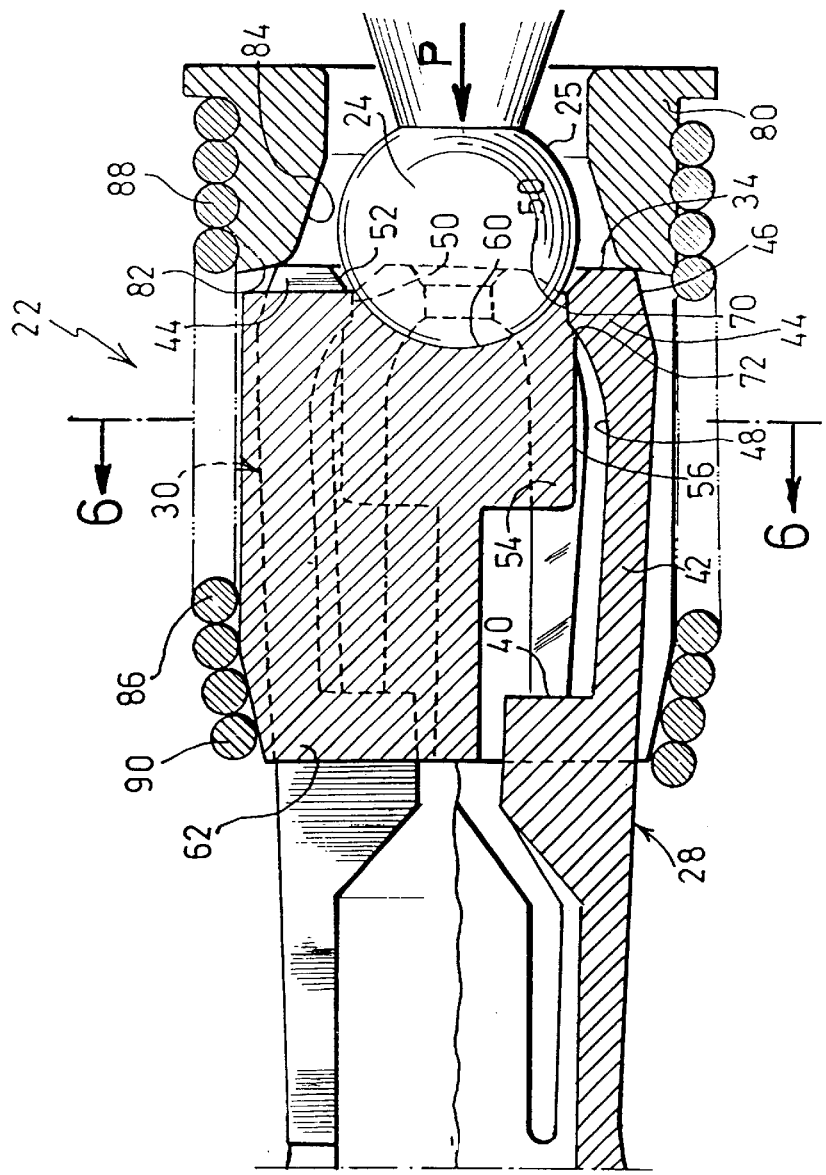
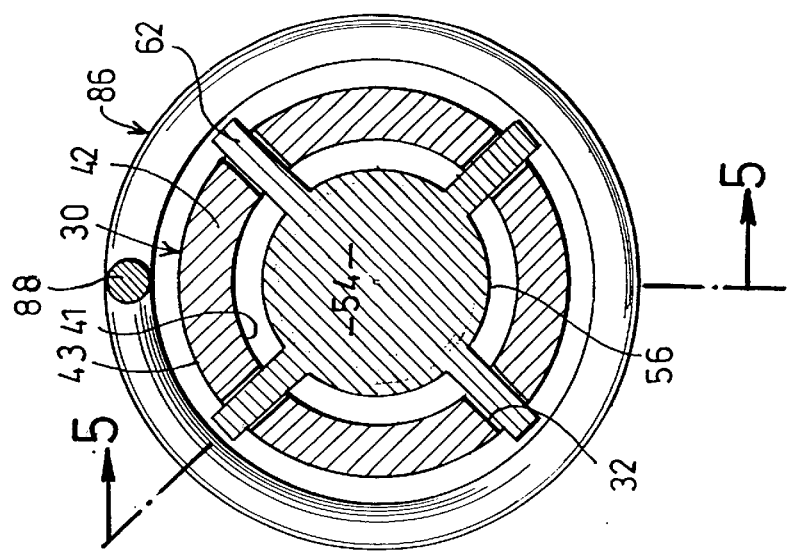

DEVICE FOR FIXING AND ARTICULATING A MASTER CYLINDER ON A MOTOR VEHICLE CLUTCH PEDAL

FIELD OF THE INVENTION

The present invention relates to coupling devices for fastening and articulating one end of a movable component on a lever for actuating that component. More especially, the invention relates to a device for fastening and articulating together an end of a hydraulic master cylinder, for controlling a clutch, and an associated clutch pedal of a motor vehicle.

BACKGROUND OF THE INVENTION

The hydraulic control of a motor vehicle clutch is typically obtained by means of a hydraulic master cylinder which is in the general form of a jack, consisting essentially of a cylinder body within which a piston is mounted for axial sliding movement, the piston having a piston rod with a free end which projects axially out of the cylinder body.

In order to actuate the master cylinder, the driver will typically act on a clutch pedal which is articulated on to the bodywork of the vehicle. The clutch pedal is normally coupled to the free end of the piston rod of the master cylinder, the body of which is usually fixed on the bulkhead of the vehicle in front of the driver. Thus, when the driver presses on the clutch pedal, the variable volume chamber which is defined by the master cylinder body and the associated piston is pressurised.

In order to ensure smooth operation of the master cylinder, the latter (typically by means of the free end of the piston rod) must be articulated on the clutch pedal. For this purpose, it has previously been proposed to make use of a coupling device which comprises a ball joint, in which a ball is mounted for pivoting movement within a ball housing which carries a complementary thrust seating surface. The ball may be fixed either at the free end of the piston rod, or on the pedal, while the ball housing, or body of the fastening device, is fixed in opposed relationship with the ball, on the pedal or on the free end of the piston rod.

In addition, it is desirable that during assembly, the connection between the piston rod and the pedal should be made as easily as possible, and preferably by automated assembly means, that is to say without any need to make use of any fitting or fastening device such as a dowel, rivet, screw and so on.

DISCUSSION OF THE INVENTION

An object of the present invention is to provide a coupling device, including a ball joint and being of the general type mentioned above, which satisfies these requirements.

According to the invention, a coupling device for the fastening and articulation of an end of a component on a lever for actuating the said component, the latter being for example a master cylinder for controlling a clutch, and the said lever being for example a clutch pedal of a motor vehicle, the fastening and articulating device comprising a ball mounted for pivoting movement in a ball housing carrying a thrust seating face having a form complementary to that of the ball, is characterised in that the ball housing is in the form of a tulip, with petals in the form of axially oriented fingers, each finger having a laminar body which is elastically deformable radially so as to enable the ball to be introduced into the ball housing space defined by the surrounding fingers, within the fingers, in elastic mating relationship with the fingers and along a main axis of the ball housing, in that the thrust seating face is mounted within the said space defined by the fingers, facing towards the free ends of the fingers, the thrust seating face being configured as a hollow spherical bowl, and in that the free end of each of at least some of the fingers is defined in a terminal finger element of the corresponding finger for retaining the ball within the ball housing.

The invention makes it particularly easy to couple a clutch master cylinder to a clutch pedal, since this operation can be carried out by simple relative axial displacement of the component carrying the ball of the ball joint with respect to the component that carries the ball housing, resulting in resilient mating engagement of the ball within the ball housing.

The device according to the invention is also of particular advantage in that it enables the ball to be carried equally well by the clutch pedal or the master cylinder, in the latter case, in particular though not necessarily, at the free end of the piston rod of the master cylinder. The tulip-shaped ball housing can be carried on the master cylinder (for example at the free end of the piston rod of the latter) or on the pedal.

Preferably, each of the petals, or fingers, of the ball housing has a said terminal finger element adapted to retain the ball in place, so diminishing wear by spreading the stresses and reducing the resulting strains.

According to a preferred feature of the invention, each said terminal finger element at the free end of each of at least some of the fingers comprises, on its internal face, a hollow spherical surface portion complementary with the surface of the ball, so as to cooperate with the ball for guiding the ball in pivoting movement and retaining it within the ball housing.

According to another preferred feature of the invention, the coupling device further includes locking means for locking the fingers by preventing the fingers from deforming elastically. Preferably, the locking means comprise a locking sleeve which is mounted for axial movement between a rear or locking position, in which it surrounds the terminal finger elements of the fingers of the ball housing externally, and a forward or deployed position, in which the finger elements of the fingers are able to be deformed elastically, substantially radially outwards. Preferably also, the locking sleeve is biassed elastically towards its locking position.

According to a further preferred feature of the invention, each finger has a free end portion having an external face configured as a frustum of a cone, and the internal surface of the locking sleeve has a complementary frusto-conical portion, the locking position of the locking sleeve being determined by the two said frusto-conical surfaces coming into contact with each other.

In a further preferred feature, each said finger has a free end portion terminating in a transverse front end surface, and the locking sleeve has a rear axial end surface oriented substantially radially, the deployed position of the locking sleeve being determined by the two said end surfaces coming into contact with each other.

According to yet another preferred feature of the invention, the said seating surface configured as a spherical bowl is formed at a front axial end of a core member which is mounted within the ball housing, for sliding movement between a rear or rest position, in which the core member is in engagement, through its rear axial end, against an internal wall of the base of the ball housing, and a forward or fitting position, in which the fingers of the ball housing are spread radially outwardly and engage axially against a portion, in facing relationship with them, of the side wall of the core member.

Preferably, the core member includes, in the region of its front end, a cylindrical lateral surface, against which complementary cylindrical surface portions, formed in the internal face of the said terminal finger elements of the fingers, bear. In addition, in preferred embodiments of the invention, the core member has radial fins for guiding its displacement within the ball housing, each said fin being received in sliding relationship within a corresponding slot separating two adjacent fingers of the ball housing.

The fins preferably project radially out of the ball housing, each fin being bounded radially by a substantially axially oriented edge, the said edges then constituting a centering surface for centering a spring for biassing the locking sleeve, the said spring being a helical draw spring having a front end fixed to the locking sleeve and a rear end fixed to the fins, so that the ball is retained in the ball housing without any clearance.

In practice, the ball is preferably fixed to the clutch pedal, the ball housing then being carried by the master cylinder. In the latter case, where the master cylinder is of the type comprising a piston and a cylinder body in which the piston is movable, then the ball housing may be fixed either to the free end of the piston rod of the master cylinder, or to the body of the latter.

Further features and advantages of the invention will appear more clearly on a reading of the following detailed description of a preferred embodiment of the invention, which is given by way of non-limiting example only and with reference to the accompanying drawings.

BRIEF DESCRIPTION OF THE DRAWINGS

FIG. 5 is a view in axial cross section taken on the line 5—5 in FIG. 6, being similar to FIG. 3 but showing the device assembled in what will be called a "fitting" position, prior to the final connection of the ball of the ball joint by resilient insertion into the ball housing.

FIG. 6 is a view in cross section taken on the line 6—6 in FIG. 5.

DESCRIPTION OF A PREFERRED EMBODIMENT OF THE INVENTION

Figure 1:
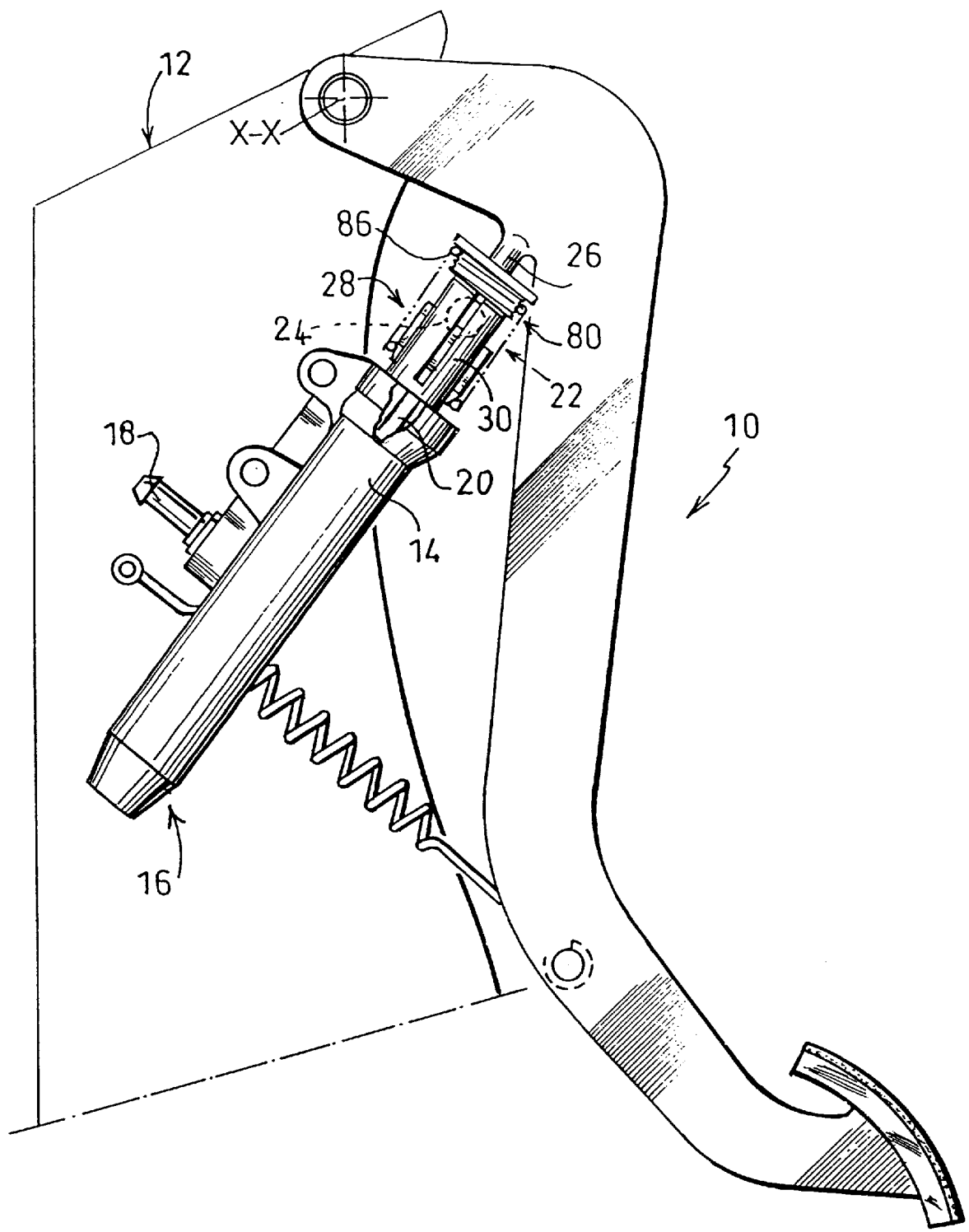
FIG. 1 is a diagrammatic view showing the arrangement of a coupling device in accordance with the invention, shown connected between a clutch pedal and a master cylinder.

FIG. 1 shows a clutch pedal 10 which is articulated about a horizontal axis X—X on an element 12 which is part of the structure of the bodywork of a motor vehicle. The element 12 may for example be a bulkhead separating the engine compartment from the cabin of the vehicle. The body 14 of a hydraulic clutch master cylinder 16 is also fixed on the bulkhead 12. The master cylinder 16 comprises, in particular, a pipe connection 18 by which the control chamber (not shown) of the master cylinder is connected to a hydraulic slave cylinder associated with the clutch of the vehicle.

The master cylinder contains a sliding piston which includes a tail portion 20, or piston rod, which projects axially out of the master cylinder body 14. The master cylinder piston is mounted inside the body 14 of the latter, so as to define with the body 14, in the usual way, the variable volume control chamber of the master cylinder. By pushing on the clutch pedal 10, the driver of the vehicle puts under pressure the control chamber of the master cylinder and also, as a result, that of the slave cylinder.

The piston rod 20 is coupled to the clutch pedal 10 by means of a coupling, or fastening and articulating, device 22. The device 22 consists essentially of an articulating ball joint having a ball 24, which, in the arrangement shown in FIG. 1, is formed integrally with the end of a rod 26. This rod 26 is part of the body of the clutch pedal 10. The ball joint also comprises a tulip-shaped ball housing 28, and in the arrangement shown in FIG. 1 the ball housing 28 is fixed at the free end of the piston rod 20 of the master cylinder 16. The ball housing may indeed be integral with the master cylinder piston.

Reference is now made to FIGS. 2 to 6, for a detailed description of the preferred embodiment of the fastening and articulating device 22 shown in the drawings by way of example. It should be noted first that the tulip shape of the ball housing 28 of the ball joint is a major feature of the present invention. In the embodiment of the invention shown in the drawings, the form of the ball housing 28 is that of a tulip with four axially oriented petals 30, or fingers, which are spaced apart circumferentially in a regular manner about the main axis Y—Y of the device 22 (and therefore of the ball housing 28). The fingers 30 are separated from each other by four axial slots 32 which extend from the front transverse end face 34 of the ball housing 28 towards the rear base portion 36 of the ball housing.

The fingers 30 are deformable elastically in the radial direction, so that they can be deployed, or spread, radially outwardly. The petals or fingers 30 project from the base of the ball housing 28. More precisely, the rear portion or base 36 of the ball housing 28 has a transverse front internal base wall 40 from which the laminar body portions of the fingers 30 project. Each of these body portions 42 terminates at its free end in an end portion of the finger.

Figure 3:
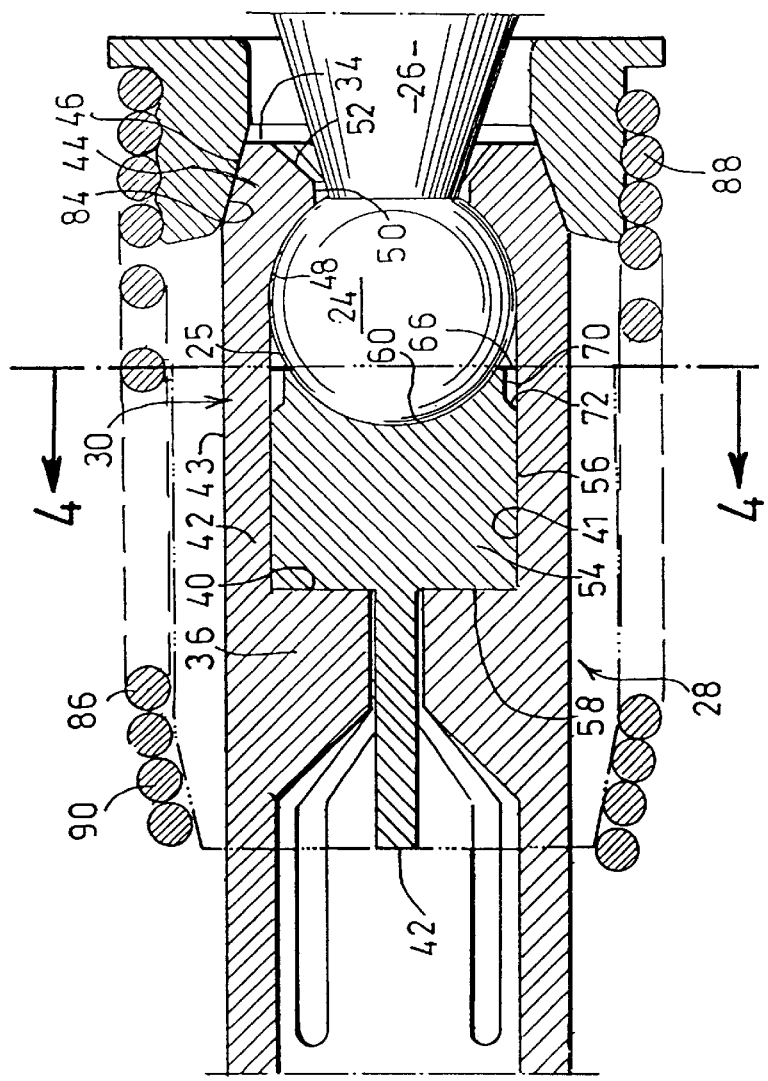
FIG. 3 is a view in axial cross section taken on the line 3—3 in FIG. 4, showing the coupling (fastening and articulating) device fully assembled.

In this example, each of these end portions consists of a terminal finger element 44, which has a nib or catch that projects radially inwardly for the purpose of retaining the ball 24 as shown in FIG. 3. In another version, it is of course possible to arrange that some of the petals or fingers 30 may be without the terminal finger elements 44, but it is preferred that all of the fingers 30 have these finger elements, in order to ensure the best possible retention of the ball 24 as mentioned earlier herein.

Figure 4:
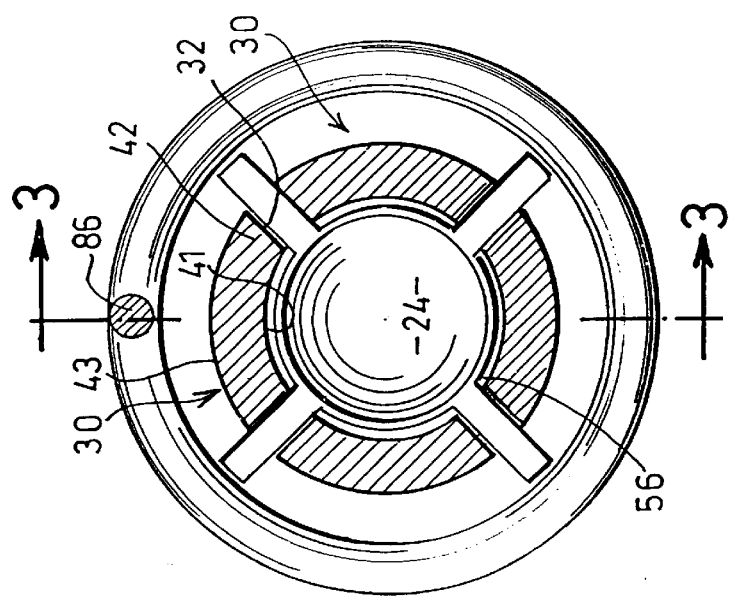
FIG. 4 is a view in cross section taken on the line 4—4 in FIG. 3.

Each laminar body portion 42 has a generally tile-like form, and has in transverse cross section, and as can be seen in particular in FIG. 4, an internal annular profile 41 and an external annular profile 43.

In the preferred embodiment shown, in order to provide the best possible contact with the ball 24, the retaining finger elements 44 have a special configuration. Thus, in the region of its free, or front, end, each petal or finger 30 has a convex frusto-conical external surface portion 46 which extends from the free end of the cylindrical outer surface 43 to the transverse end face 34. In its terminal finger element 44, each finger 30 has on its inner surface a spherical surface portion 48 which extends from the end of the annular cylindrical inner surface 41 to a short internal cylindrical surface 50, the surface 50 being joined to the transverse end face 34 through a conical chamfer 52.

The hollow spherical surface portions 48 are concave, and are complementary to the convex spherical surface 25 of the ball 24, that is to say they are of substantially the same radius as the latter. The surface portions 48 guide the ball 24 and retain it within the ball housing 28. They therefore constitute a guide and retaining seating 48 for the ball 24.

The tulip-shaped ball housing 28 defines, by virtue of the internal cylindrical surfaces 41 of the petals or fingers 30, together with its rear base wall 40, a housing or internal space, in which a core member 54 is mounted for sliding movement. A draw spring 86 acts on the core member 54 in a manner to be described later herein. The core member 54 mounted within the fingers 30 is a solid component of generally cylindrical form with an outer a cylindrical wall 56 and a rear transverse, or radial, face 58. In the fully assembled condition shown in FIG. 3, the transverse rear face 58 bears against the base wall 40 of the ball housing 28, while at its front end, the core member 54 is formed with a thrust seating surface 60 in the form of a hollow spherical bowl complementary to the convex spherical surface 25 of the ball 24. The thrust seating surface 60 is thus a concave spherical surface which bears against the ball surface 25.

The axial length of the core member 54 is such that, in the fully assembled position, the concave spherical thrust seating surface 60, and the spherical guide and retaining seating 48, both consisting of concave surface portions, are substantially centered on the axis of the ball 20, so that, in combination, they constitute a generally hollow spherical seating for the ball 24, in which the ball is able to pivot about its center. This spherical seating is accordingly in two parts 48 and 60, one of which is a retaining part 48, the other being a thrust part 60.

Figure 2:
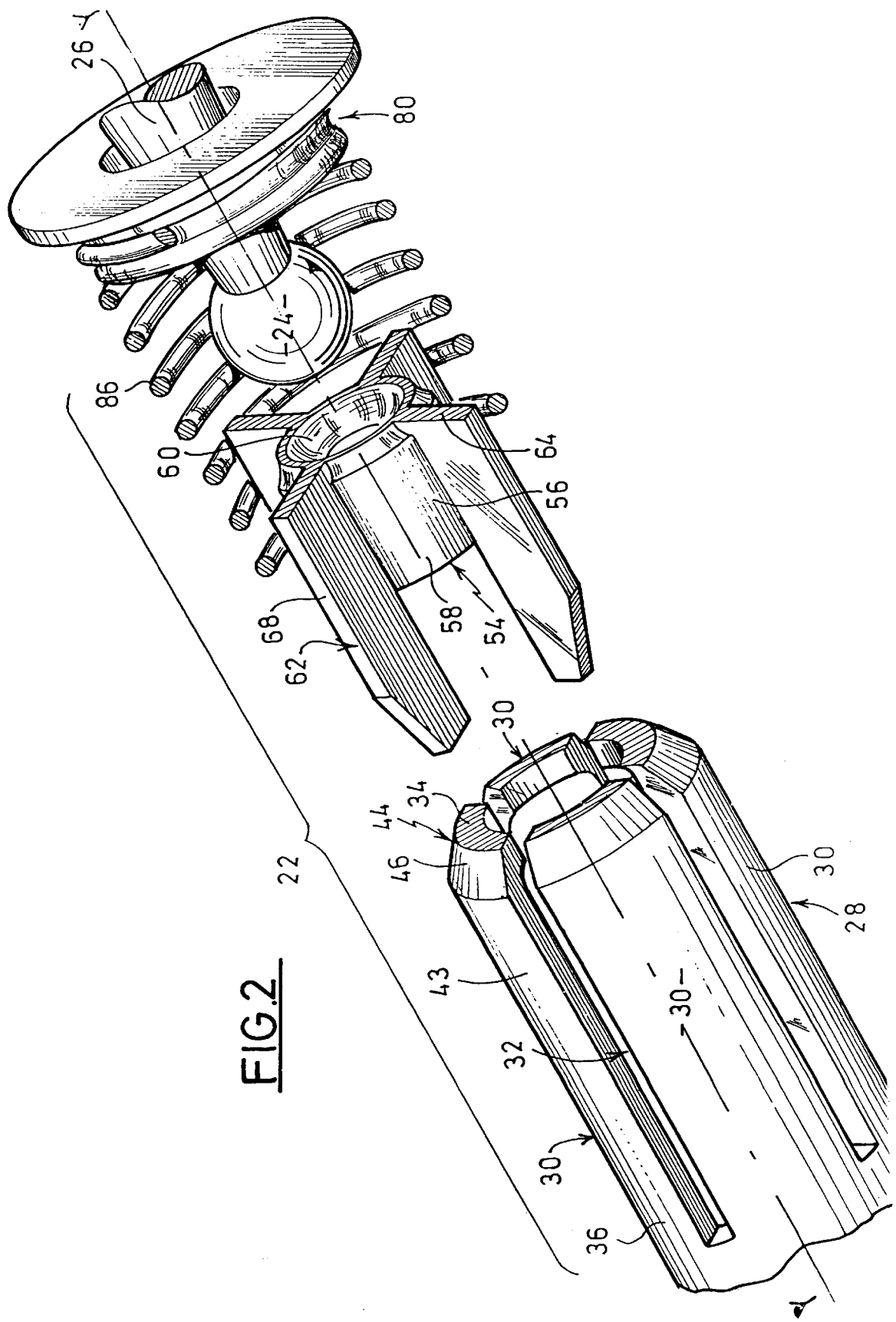
FIG. 2 is an exploded perspective view of the main components of a coupling device having a preferred form of construction in accordance with features of the invention.

As is best seen in FIG. 2, the core member 54 has four axially oriented fins 62, which are spaced apart in a regular manner, with each fin 62 projecting radially outwards from and beyond the cylindrical surface 56 of the core member 54. Each of the fins 62 is received, with a clearance, in sliding relationship in a corresponding one of the slots 32 by which the adjacent fingers 30 are separated. The core member 54 is thus prevented from rotation with respect to the ball housing 28 by mating cooperation of the tenon and mortice type, in which the tenons are the fins 62 and the mortices are the slots 32. It will of course be understood that the slots 32 can be made longer axially than the fins 62.

Each fin 62 extends axially towards the rear from the rear transverse end face 58 of the core member 54, and is bounded axially towards the front by a transverse terminal front edge 64, which lies in the same radial plane as the transverse front terminal edge 66 (FIG. 3) of the core member 54. Radially towards the outside, each fin 62 is bounded by an outer edge 68, FIG. 2, which is parallel to the axis Y—Y and which lies radially outwards of the annular outer cylindrical wall 43 of the fingers 30. Thus, each of the fins 62 projects radially through the corresponding slot 32. In the region of its transverse front terminal edge 66, the cylindrical wall 56 of the core member 54 has an axially oriented cylindrical surface 70 of reduced diameter, which is bounded axially towards the rear by a shoulder 72. This shoulder constitutes an abutment for cooperation (in a manner to be described below) with the finger elements 44 of the fingers 30.

As has been mentioned above, each petal or finger 30 is deformable elastically in a substantially radial direction. Thus, when the fingers 30 are spread, their retaining finger elements 44 are deflected away from each other from their normal or rest position, which corresponds to the fully assembled condition shown in FIG. 3, and towards a fitting position shown in FIG. 5. With the ball housing 28 opened up, or expanded radially, in this way, the ball 24 can be more easily introduced by resilient insertion into the ball housing 28 along the main axis Y—Y of the latter.

For this purpose, the core member 54 is displaced axially forward, that is to say from left to right with respect to FIG. 3. This puts the core member 54 into the fitting position of FIG. 5, in which the free terminal portions 44 of the fingers 30 bear, through their internal cylindrical surface portions 50, on the cylindrical surface 70 of the core member 54. In this position, the finger elements 44 are in a radially expanded condition against the action of their own elasticity, thus defining an aperture of enlarged diameter for introduction of the ball 25 into the ball housing 28.

The core member 54 may be put into the fitting position shown in FIG. 5 by acting on it through the portions of its fins 62 that project radially out of the ball housing through the slots 32. The fitting position is then defined axially by the cylindrical internal surfaces 50 of the terminal portions 44 coming into abutment against the shoulder 72, thus avoiding any need to extract the core member 54.

It will be noted that the shoulder 72 is inclined with respect to the radial direction, because it is the end zones of the surfaces 48 that come into contact with the shoulder 72. It is thus these end zones, which join the concave surfaces 48 to the cylindrical internal surfaces 50, that act as a reaction element in opposition to the shoulder 72.

In order to introduce the ball 24 into the ball housing 28, starting from the position shown in FIG. 5, it is merely necessary to push the ball 24 against the hollow spherical seating surface 60 of the core member 54, and to continue applying a pushing force in the direction of the arrow P in FIG. 5 (along the main axis Y—Y of the housing 28), so as to cause the core member 54 to be retracted backwards in the ball housing 28, that is to say from right to left with reference to FIG. 5, until the rear transverse end face 58 of the member 54 meets the wall 40 of the housing 28.

During this movement, the convex spherical surface 25 of the ball 24 cooperates with the chamfer 52 formed on the retaining finger elements 44, so forcing the latter radially apart even more, until the diametral transverse plane of the ball 24 passes the finger elements 44, after which it becomes trapped within the ball housing 28 and is in the fully fitted position shown in FIG. 3. In this position, the ball 24 is retained elastically, that is to say virtually without any clearance, by the retaining finger elements 44 of the fingers 30, in thrust engagement with the seating surface 60. The ball 24 is thus fitted within a housing which is defined by the thrust seating surface 60 and the retaining seating surfaces 48.

The fastening and articulating device 22 is locked in its fully fitted position by means of a locking sleeve 80 (see FIG. 2), which is retractable for the purpose of unlocking the device 22. The purpose of the locking sleeve 80 is essentially to prevent any accidental opening up of the retaining finger elements 44 of the fingers 30, that is to say to prevent any accidental escape of the ball 24 axially out of its housing 28 under the effect of any tractive force which may be applied to the housing 28, and which might tend to cause the ball to separate from the seating surfaces 48 and 60.

To this end (see FIGS. 3 and 5), the locking sleeve 80 is a component which is generally in the form of a solid of revolution and which includes, in the vicinity of, and extending forward from, its rear transverse face 82, an internal concave frusto-conical surface 84 having an apex angle substantially equal to that of the convex frustoconical surfaces 46 of the retaining finger elements 44 of the fingers 30.

In the locked position shown in FIG. 3, the surface 84 surrounds the surfaces 46 and therefore also the retaining finger elements 44.

The locking sleeve 80 is biassed elastically, towards its locking position shown in FIG. 3, by the draw spring 86, which is a helical spring. One end 88 of the spring 86 is fixed on the locking sleeve 80. Its other end 90 is retained axially on the inclined rear portions of the edges 68 of the fins 62 of the core member 54, as shown in FIG. 5. The front end 88 of the spring can in practice be fastened on to the locking sleeve 80 in any suitable way, for example by force-fitting, mating engagement or screw fastening. In this example, the locking sleeve 80 is formed with grooves in its outer periphery, and the spring end 88 is force-fitted into these grooves. The locking sleeve 80 has a projecting collar portion shown in FIGS. 3 and 5, which defines a thrust shoulder for engagement with the endmost turn of the spring 86.

In this way, the spring 86 permanently biasses the locking sleeve 80 axially towards the rear, that is to say from right to left in FIGS. 3 and 5, with respect to the core member 54 and the retaining finger elements 44. As a result, the spring 86, firstly, prevents any radial spreading of the finger elements 88, and secondly, exerts a gripping force in the radial direction on the finger elements 44 cooperating with the ball 24.

In order to unlock the device 22, in particular with a view to fitting the ball 24 into the ball housing 28, or to facilitate dismantling of the assembly, it is merely necessary to withdraw the locking sleeve 80, by pulling it axially forward, that is to say from left to right in FIG. 3, so as to put it in the withdrawn or forward position shown in FIG. 5. Thus, in FIG. 5, the locking sleeve 80 bears through its transverse rear end face 82 against the front transverse face 34 of the fingers 30, the latter being opened up radially by the core member 54 in the manner described above. With the locking sleeve 80 in this forward position, no force is transmitted from the spring 86 to the ball 24, and the latter can be simply withdrawn axially.

Once the ball 24 is introduced into the interior of the ball housing 28 in the manner described above, the locking sleeve 80 is returned by the spring 86 to its locking position shown in FIG. 3, with the conical surfaces 46 and 84 coming into contact with each other.

In order to dismantle the ball joint, a pulling force is of course also exerted on the locking sleeve so as to release the fingers 30 in the manner described above. An axial clearance is preferably provided between the locking sleeve 80 and the transverse face 34 of the housing 28, so as to enable the petals or fingers 30 to be released easily, and so as to displace the core member 54 towards the ends 44. If necessary, the fins 62 of the core member can also be moved manually.

The invention is not limited to the embodiment described above, nor is it limited to the arrangement shown in FIG. 1. For example, the ball 24 of the device 22 may, in particular, be formed on the free end of the piston rod 20, with the ball housing 28 being carried by the body of the clutch pedal 10.

In another version, and in the case where the clutch master cylinder 16 is connected to the bodywork 12 of the vehicle through the free end of the piston rod 20, it is the body 24 of the master cylinder 16 which can be equipped with the ball housing 28 or with the ball 24.

As will have been understood from the foregoing, the thrust seating surface 60 faces towards the free ends 44 of the fingers 30. The core member 54 is resiliently biassed axially towards these free ends 44 by the draw spring 86.

The initial fitting of the core member 54 in the ball housing 28 is obtained by simple axial insertion, with the finger elements 44 being moved radially apart. Once fitted, the core member 54 is prevented from escaping by the shoulder 72 as shown in FIG. 5. It will also be noted that normally, i.e. when the device is working, deformation of the fingers 30 is prevented by the locking sleeve 80.

What is claimed is:

1. A coupling device for fastening and articulating together an end of a component and a lever for actuating said component, the coupling device comprising a ball housing having a thrust seating surface, and a ball pivoted in the housing, said thrust seating surface being of complementary form to the ball, one of said ball and ball housing being adapted to be carried by an end of said component and the other by said actuating lever, the ball housing comprises axially oriented fingers defining an internal space of the ball housing surrounded by said fingers, the housing defining a main axis thereof, each said finger having a body portion which is elastically deformable radially so as to spread the fingers, whereby to enable the ball to be introduced into said internal space of the ball housing along said axis and into resilient nesting engagement with the fingers, each finger having an end portion at its free end, the thrust seating surface being within the internal space of the ball housing and facing towards the free ends of the fingers, the thrust seating surface being configured as a hollow spherical bowl, and said end portion of each of at least some of the fingers consisting of a terminal finger element configured for retaining the ball within the ball housing, wherein the thrust seating surface is formed on a core member having a rear end and a front end, said front end of the core member defining therein said thrust seating surface in the form of a spherical bowl, the ball housing having a base defining an internal wall of the ball housing, the core member further having a side wall portion and being mounted coaxially in the ball housing for sliding axial movement within the latter between a rear, rest position, in which the core member engages through its rear end against said internal wall of the ball housing, and a forward, fitting, position in which said fingers are spread radially outwardly and bear elastically against said side wall portion, in facing relationship therewith, of the core member.

2. A coupling device according to claim 1, wherein each said terminal finger element has an internal face defining a hollow spherical surface portion complementary with the ball surface and cooperating with the latter, for guiding the ball in pivoting movement and for retaining the ball within the ball housing.

3. A coupling device according to claim 2, further including locking means carried by the ball housing for engagement with said fingers, whereby to lock the fingers against resilient deformation thereof.

4. A coupling device according to claim 3, wherein the locking means comprise a locking sleeve mounted on the ball housing for axial movement between a rear, locking position and a forward, unlocking position, whereby in the locking position the sleeve externally surrounds the free ends of said fingers, and in its unlocking position the sleeve is free of the said fingers, whereby the fingers are able to be deformed elastically in a substantially radially outward direction when the locking sleeve is in its unlocking position.

5. A coupling device according to claim 4, further including means carried by the ball housing and engaged with the locking sleeve for resiliently biassing the locking sleeve towards its locking position.

6. A coupling device according to claim 4, wherein each said terminal finger element has a first frusto-conical external surface, the locking sleeve having an internal surface defining a second, complementary, frusto-conical surface, for making contact with the first frusto-conical surface whereby to define said locking position of the locking sleeve.

7. A coupling device according to claim 4, wherein each said finger end portion has a transverse front end surface, the locking sleeve having a substantially radially oriented rear end surface for making contact with said front end surface of the fingers, whereby to determine the unlocking position of the locking sleeve.

8. A coupling device according to claim 1, wherein the core member has a first cylindrical surface in the region of its front end, said first cylindrical surface constituting said side wall portion of the core member, each said terminal finger element having an internal face defining a second cylindrical surface for engagement with said first cylindrical surface in the said fitting position of the core member.

9. A coupling device according to claim 1, wherein the core member further includes radial fins, the ball housing defining slots between said fingers, each said fin being received in sliding movement in a corresponding one of said slots, whereby to guide axial displacements of the core member in the ball housing.

10. A coupling device according to claim 9, wherein the fins project radially outside the core housing, each fin having a substantially axial outer edge, the locking device further including a locking sleeve carried on the ball housing for axial movement towards and away from a locking position surrounding the said fingers, so as to prevent the fingers from being deformed outwardly in said locking position of the sleeve, and a return spring in the form of a helical draw spring for biassing the locking sleeve towards its locking position, said spring having a front end fixed to the locking sleeve and a rear end fixed to said fins of the core member, with said edges of the fins centering the return spring.

11. A coupling device according to claim 1 in combination with a master cylinder for control of a clutch, and with a vehicle clutch pedal, the ball of the coupling device being fixed to the clutch pedal.

12. A combination according to claim 11, wherein the master cylinder comprises a cylinder body and a piston movable axially in the cylinder body, the piston comprising a piston rod having a free end, and the ball housing being fixed to the free end of the piston rod.

13. A combination according to claim 11, wherein the master cylinder comprises a cylinder body and a piston movable axially in the cylinder body, the ball housing being fixed to the cylinder body.

* * * * *